United States Patent
Malachi et al.

(10) Patent No.: US 10,372,908 B2
(45) Date of Patent: Aug. 6, 2019

(54) SYSTEM AND METHOD FOR DETECTING MALWARE IN A STREAM OF BYTES

(71) Applicant: Trap Data Security Ltd, Tel Aviv (IL)

(72) Inventors: Yuval Malachi, Hod Hasharon (IL); Mori Benech, Tel Aviv (IL)

(73) Assignee: Trap Data Security Ltd., Tel Aviv (IL)

( * ) Notice: Subject to any disclaimer, the term of this patent is extended or adjusted under 35 U.S.C. 154(b) by 136 days.

(21) Appl. No.: 15/218,103

(22) Filed: Jul. 25, 2016

(65) Prior Publication Data
US 2018/0025158 A1 Jan. 25, 2018

(51) Int. Cl.
  *G06F 21/55* (2013.01)
  *G06F 21/56* (2013.01)
  *G06F 21/51* (2013.01)
  *G06F 9/54* (2006.01)

(52) U.S. Cl.
  CPC .............. *G06F 21/566* (2013.01); *G06F 9/54* (2013.01); *G06F 21/51* (2013.01); *G06F 2221/033* (2013.01)

(58) Field of Classification Search
  CPC .......... G06F 21/566; G06F 21/05; G06F 9/54; G06F 2221/033
  See application file for complete search history.

(56) References Cited

U.S. PATENT DOCUMENTS

| | | | | |
|---|---|---|---|---|
| 7,779,472 B1* | 8/2010 | Lou | ...................... | G06F 21/566 726/22 |
| 8,789,174 B1* | 7/2014 | Gupta | ................... | G06F 21/552 709/223 |
| 8,832,829 B2* | 9/2014 | Manni | ................... | G06F 21/566 726/22 |
| 9,202,054 B1* | 12/2015 | Lu | ......................... | G06F 21/566 |
| 9,672,355 B2* | 6/2017 | Titonis | .................... | G06F 21/56 |
| 9,858,416 B2* | 1/2018 | Niemela | ............... | G06F 21/565 |
| 2010/0031353 A1* | 2/2010 | Thomas | .............. | G06F 11/3604 726/22 |
| 2010/0077476 A1* | 3/2010 | Adams | .................. | G06F 21/566 726/22 |
| 2013/0097706 A1* | 4/2013 | Titonis | .................... | G06F 21/56 726/24 |
| 2013/0326636 A1* | 12/2013 | Prchal | ................... | H04L 63/308 726/28 |
| 2014/0082694 A1* | 3/2014 | Sanghavi | ................ | G06F 21/31 726/3 |
| 2014/0304797 A1* | 10/2014 | Fu | ....................... | H04L 63/0823 726/10 |
| 2015/0326592 A1* | 11/2015 | Vissamsetty | ........ | H04L 63/1408 726/24 |
| 2016/0196425 A1* | 7/2016 | Davidov | .............. | G06F 21/566 726/23 |

(Continued)

Primary Examiner — Hee K Song
(74) Attorney, Agent, or Firm — Pearl Cohen Zedek Latzer Baratz LLP

(57) ABSTRACT

A system and method may include a first unit configured to receive a stream of bytes, cause a second unit to execute the stream of bytes from a selected first offset, and monitor an execution of the stream of bytes by the second unit. A second unit may be configured to execute the stream of bytes from the selected offset. The first unit may be configured to determine, based on the execution of the stream of bytes, whether or not the stream of bytes includes a malware.

21 Claims, 3 Drawing Sheets

(56) References Cited

U.S. PATENT DOCUMENTS

| | | | |
|---|---|---|---|
| 2016/0261631 A1* | 9/2016 | Vissamsetty | H04L 63/1491 |
| 2016/0283716 A1* | 9/2016 | Momot | G06F 21/566 |
| 2016/0381043 A1* | 12/2016 | Yamada | H04L 63/1425 |
| | | | 726/23 |
| 2016/0381054 A1* | 12/2016 | Agaian | H04L 63/1408 |
| | | | 726/23 |
| 2017/0243000 A1* | 8/2017 | Shraim | G06F 21/53 |

* cited by examiner

SYSTEM AND METHOD FOR DETECTING MALWARE IN A STREAM OF BYTES

FIELD OF THE INVENTION

The present invention relates generally to detecting malware. More specifically, the present invention relates to detecting, in a stream of bytes, malware such as shellcode.

BACKGROUND OF THE INVENTION

Malware is known in the art. Generally, malware is malicious software intended to damage computers, exploit computer systems, steal information etc. As known in the art, shellcode malware that typically starts a command shell thus enabling an attacker to control the compromised machine. Since shellcode is typically communicated as payload or in a stream of bytes, detecting a shellcode using known in the art systems and methods such as antivirus agents or firewalls may be impossible.

SUMMARY OF THE INVENTION

In some embodiments, a first unit may be configured to receive a stream of bytes, cause a second unit to execute the stream of bytes from a selected first offset, and monitor an execution of the stream of bytes by the second unit. A second unit may be configured execute the stream of bytes from the selected offset. The first unit may be configured to determine, based on the execution of the stream of bytes, whether or not the stream of bytes includes malware, a malware, or a malware software unit or module.

If it is determined that the stream of bytes does not include a malware, then an embodiment may select a second offset in the stream of bytes; and cause the second unit to execute the stream of bytes from the selected second offset. Determining that a stream of bytes includes a malware may include identifying a behavior of a shellcode when executing the stream of bytes. The second unit may be configured to execute the stream of bytes directly on a hardware controller, at a native speed of the controller. An embodiment may be configured to prevent a malware, when executed, to take control of a hardware controller.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
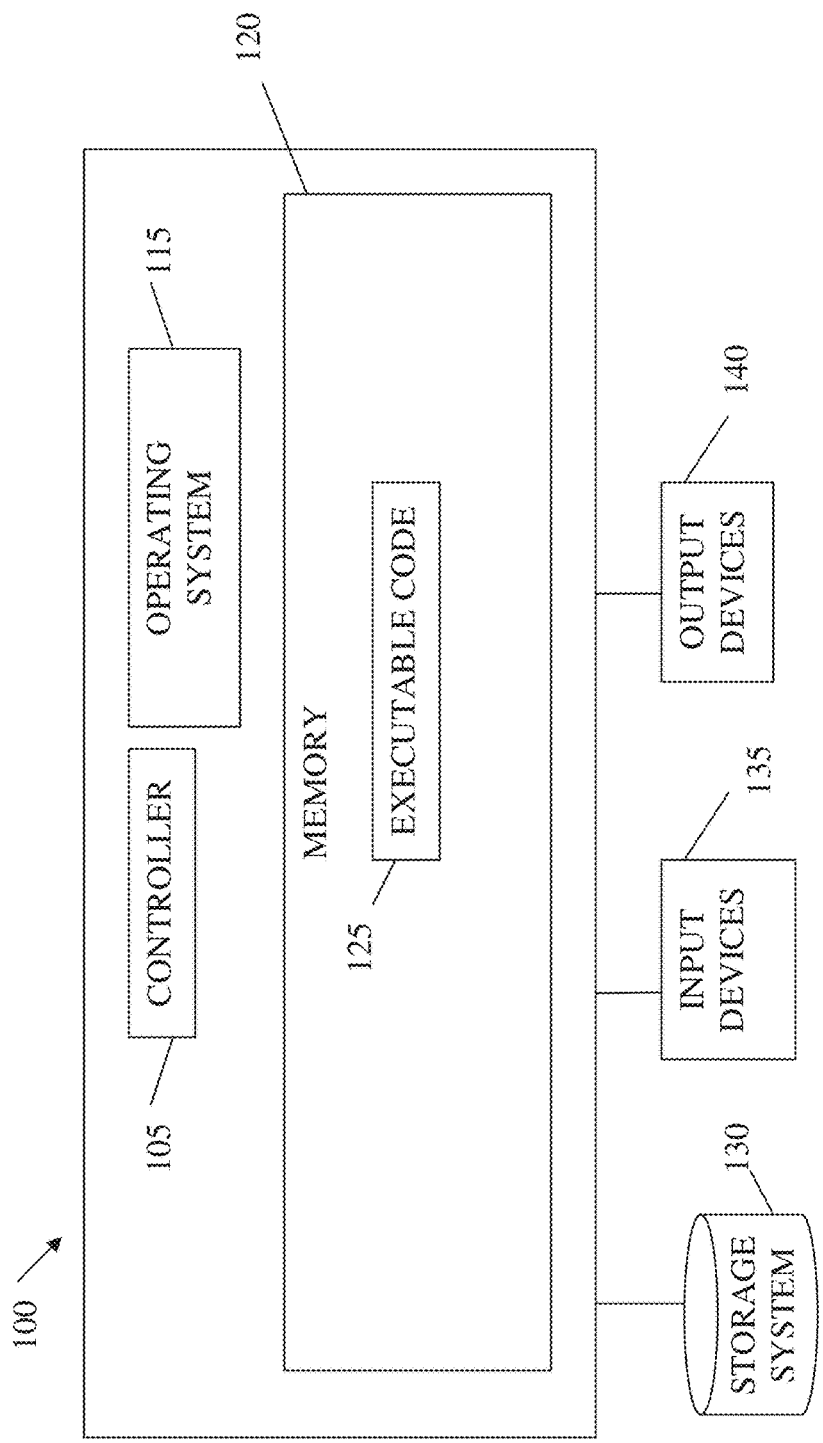
FIG. 1 shows high level block diagram of an exemplary computing device according to illustrative embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method according to some embodiments of the invention may include receiving a stream of bytes, performing a monitored execution of the stream of bytes and determining, based on the execution of the stream of bytes, or based a result of the execution, whether or not the stream of bytes includes malware software, a malware, or a malware software unit or module. Methods according to embodiment of the invention may be carried out by one or more units or computing devices similar to the computing device described in FIG. 1, or other devices.

Reference is made to FIG. 1, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc., for example by executing code or software More than one computing device 100 may be included, and one or more computing devices 100 may act as the various components, for example the components shown in FIG. 2. For example, each of manager unit 210, operating system emulation (OS-EMU) unit 250, client 220, target unit 230 and runner unit 260 described herein may be, be executed by, or may include components of, computing device 100. For example, by executing executable code 125 stored in memory 120, controller 105 may be configured to carry out a method of detecting malware as described herein. For example, a first controller 105 may be configured to receive a stream of bytes, select an offset in the stream of bytes, cause a second controller 105 to execute the stream of bytes from a selected first offset, and monitor an execution of the stream of bytes by the second controller 105. The first controller 105 may be configured to determine, based on the execution (or based on a result of the execution) of the stream of bytes by the second controller 105, whether or not the stream of bytes includes malware software, a malware, or a malware software unit or module. A third controller, CPU or computer, may be or may include OS-EMU 250. For example, a result may be a crash as described and, based on such result, manager unit 210 (or target unit 230) may determine that, at least at the selected offset, byte stream 240 does not include a shellcode or other malware as described. A result of an execution of byte stream 240 may be a behavior of a shellcode as described. A result as described may cause manager unit 210 to determine that, at the selected offset, byte stream 240 includes a shellcode or other malware as described.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that detects, in a stream of bytes, a shellcode or other malware as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein (e.g., manager unit 210, OS-EMU 250, client 220, target unit 230 and runner unit 260) may be, or may include, controller 105, memory 120 and executable code 125.

Storage system 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of CPU's or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Figure 2:
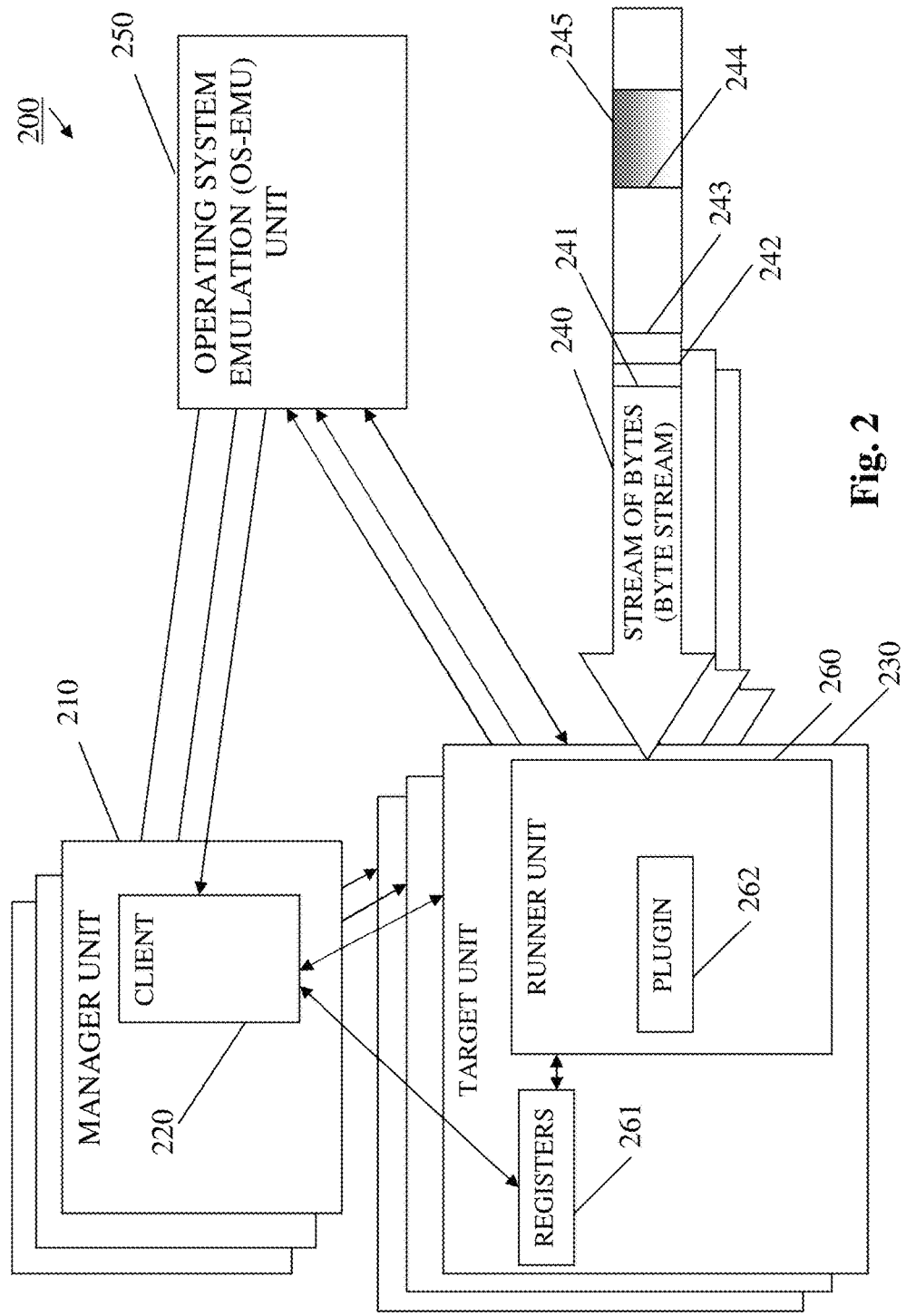
FIG. 2 is an overview of a system according to illustrative embodiments of the present invention.

Reference is made to FIG. 2, an overview of a system 200 and flows according to some embodiments of the present invention. As shown, a system may include a manager unit 210, an OS-EMU unit 250, a client 220, a target unit 230 and runner unit 260 that may be included in the target unit 230. As shown, registers 261 included in and/or used by runner unit 260 may be accessible to manager unit 210 and/or client 220. For example, registers 261 may be a set of CPU registers as known in the art and may be read by manager unit 210 and/or client 220 and/or updated or written to by manager unit 210 and/or client 220. As further shown, runner unit 260 may include a plugin (or plug-in) 262 that may be a plugin as known in the art, e.g., an executable code segment designed for a specific task and included in runner unit 260 (or in target unit 230. In a preferred embodiment, target unit 230 may be a process that spawns or executes runner unit 260. As referred to herein and known in the art, spawning a process relates to loading into memory and executing a new child process by a parent process. A process as referred to herein and in the art is an executed instance of a computer program or application. A process may include a context or state, e.g., as reflected or defined by values in registers (e.g., registers 261) or memory. A process on a first computer or controller may spawn another process on a second computer, controller or CPU core.

System 200 may quickly and efficiently detect shellcodes included in byte streams by executing the shellcodes at native speed. In some embodiments and as described, system 200 may be, or may enable, a runtime sandbox for shellcode detection and execution. For example, target unit 230 shown in FIG. 2 and described herein may be, may function as, or may include, a sandbox for shellcode detection and execution. As described, unlike sandboxes known in the art, execution of a shellcode according to embodiments of the invention may be done so that the execution is fully controlled, specifically, a shellcode is prevented from directly accessing sensitive resources such as internal operating system registers, dynamic link library (dll or DLL) and/or other resources. As known in the art, a shellcode is a small malware whose purpose is to open a shell on the target for a remote attacker, or to transfer a more sophisticated executable malware and run it on the target. Generally, a shell as known in the art and as referred to herein is a user interface enabling access to an operating system's services. For example, a shell may provide command-line interface (CLI) or graphical user interface (GUI). In some cases, a shell may be opened by shellcode that may be code included in a stream of bytes (e.g., in payload as known in the art). For example, and as known in the art, an attacker may include a shellcode in a stream of bytes downloaded to a victim's computer and, when executed on the victim's computer, the shellcode executes a shell (or causes a CPU of the victim's computer to execute a shell) that enables the attacker to gain control of the victim's computer.

System 200 may be implemented on any operating system, e.g., operating system 115 may be the Linux OS, Windows etc. It will be understood that regardless of an OS used by system 200, system 200 may detect shellcode or other malware that target any OS. For example, in some embodiments, components of system 200 run, or are executed on, Linux and are used to detect shellcode that targets (or that is designed for) Windows. Since a system and method according to some embodiments runs a shellcode directly on a CPU as described, the OS targeted by a shellcode that may be different from the OS used by a system and method as described. For example, runner unit 260 may be a software unit executed on Linux OS and may detect shellcode that targets (or is designed for) Windows OS.

As further described, system 200 may receive or use a stream of bytes as input, search the input for shellcode or other malware by iteratively selecting an offset (also referred to herein as "byte offset") and executing the stream of bytes from a selected offset. For example, a first offset selected may be offset 241 a second, subsequent offset selected may be offset 242 and a third offset selected may be offset 243 as shown. An offset as referred to herein may be a byte count, number or distance from the first byte in a stream of bytes. For example, system 200 may execute a stream of bytes from offset zero ("0") which may be the first byte in byte stream 240, and, if no shellcode is found based on the execution and a predefined condition is met, system 200 may select (or re-select) a new offset, e.g., 512 and execute the stream of bytes from offset 512. Selection of offsets may be according to any suitable logic. For example, in some embodiments, offsets may be selected according to fixed or preconfigured steps, e.g., 512 byte steps or any other number. For example, offset 241 may be the first byte in byte stream 240 (e.g., offset zero), offset 241 may be 512 bytes into byte stream 240, offset 242 may be at 1024 bytes and so on. In other embodiments, an offset may be selected based on a result of executing a byte stream. For example, and as described, following a crash, or a termination of an execution of the byte stream from a first offset, a second or next offset may be selected such that the byte that caused the crash is skipped and the next or immediately following byte is selected as the next offset.

Any number of offsets may be selected or re-selected, e.g., as shown by offsets 241 and 242. As shown by block 245, a malware or shellcode may be included in byte stream 240. For example, and as shown, shellcode 245 may be placed (e.g., by an attacker or hacker) at offset 244 in byte stream 240. As described, at some point, offset 244 may be selected, when a sequence of bytes starting at offset 244 are treated as executable code and executed, shellcode 245 may be executed. As described, execution of a shellcode may be identified. Accordingly, by iteratively executing byte stream 240 from selected offsets shellcode 245 may be detected.

Executing a stream of bytes as referred to herein may include providing the stream of bytes to a processor as if the stream of bytes is an executable code as known in the art, e.g., bytes (8 bits), words (32 bits) or double-word (64 bits) are fed to a processor, one by one or otherwise, as if they are executable code and the processor or controller is made to treat the bytes, words or other units in the stream of bytes as if they are bytes, words or other units of executable code. Of course, since a stream of bytes may not necessarily be (and typically is not) executable code, in many cases, if not controlled, monitored and/or managed as described, execution of the stream of bytes will result unexpected results, e.g., raise a signal, halt a CPU or crash as referred to in the art. As described, by executing a stream of bytes and monitoring the execution, system 200 may identify or detect a shellcode included (or hidden) in the stream of bytes (e.g., shellcode 245) based on the execution, if it is determined, based on execution of the stream of bytes from a first offset (e.g., offset 241), that no shellcode is present at, or starting from, the first offset, the offset may be incremented (or a second offset, e.g., offset 242, may be selected) and the process may be repeated.

It will be understood that the terms "byte stream" and "stream of bytes" as used herein refer to any stream or flow of data, e.g., a sequence of bytes, words, double-words etc. A byte stream and stream of bytes may be, or may include, any content, for example, a stream of bytes may be, or may include, data downloaded to a computer from the internet, e.g., a video clip, a file, a webpage and the like. For example, installed in an organization, a system according to some embodiments may search for shellcode in any stream of data or bytes, or file, entering the network of the organization. For example, content such as e-mail messages, webpages and files transferred may be termed herein and treated by a system and method according to some embodiments of the invention as a byte stream and shellcode or other malware may be searched for in such content, e.g., when the content is streamed, or flowing, into an organization. For example, system 200 may be placed at the entrance to an organization's network (e.g., where a firewall is typically placed) and may search for, and detect, malware in any stream of data entering the organization's network.

Identifying a shellcode based on execution of a stream of bytes may be accomplished based on a known behavior or pattern (e.g. activity pattern) of shellcodes. For example, identifying that execution of a stream of bytes, from a selected offset, causes a processor to perform a known set or series of operations which are known to be required in order to open a shell may cause system 200 to determine that a shellcode was identified in the selected offset. In other cases or embodiments, a shellcode may be characterized, e.g., by a set of operation and/or the order by which the operations are executed. For example, it may be known that a shellcode always calls a set of system calls in a predefined or known order. Accordingly, by observing or identifying a specific behavior, e.g., one that includes a known sequence of operations (e.g., calling a set of system calls according to a previously known order when executing a byte stream as described) may cause an embodiment to identify and/or determine that the stream of bytes includes a shellcode.

For example, any one of: calling a known sequence of known functions or system calls; creating files with known in advance names, possibly in known locations or folders and/or modifying system internal registers may be a behavior that is recognized as a behavior of a shellcode. As described, manager unit 210 may control and monitor an execution of a byte stream and identify, based on operations performed during the execution of the byte stream, a behavior of a shellcode.

Manager unit 210 may receive a stream of bytes and may provide the stream of bytes to target unit 230 and/or to runner unit 260. Manager unit 210 may cause target unit 230 and/or runner unit 260 to execute a byte stream, e.g., by setting values of registers (for example, manager unit 210 may set the value of the program counter of the CPU that executes runner unit 260) as described. Accordingly, a first process on a controller or CPU core (e.g., included in manager unit 210) may cause a second process on a controller or CPU core (e.g., included in target unit 230) to execute a byte stream. Accordingly, although FIG. 2 shows stream of bytes 240 provided to runner unit 260, in some embodiments, the stream of bytes may be initially received by, or provided to, manager unit 210 and directed from (or by) manager unit 210 to runner unit 260. As described, execution of stream of bytes 240, by runner unit 260 may be monitored, supervised and/or managed by manager unit 210. For example, manager unit 210 may have access to all runner unit 260's process environment, e.g., memory, CPU instructions, CPU registers (e.g., registers 261) and the like. For example, runner unit 260 may include a memory 120 as described and manager unit 210 may have full access to the memory 120 of runner unit 260.

Stream of bytes (or byte stream) 240 may be any stream of byte, e.g., a randomly selected stream of bytes entering a network of an organization or downloaded to a user computer. For example, hackers may attempt to gain control of a victim computer by embedding a shellcode (e.g., as shown by shellcode 245) in content downloaded by users (e.g., webpages, video clips etc.) Embodiments of the invention may protect a user or organization by examining any byte or data streams flowing into an organization or into a user computer. As described, in some embodiments, searching for malware and/or shellcode in a byte stream or data stream may include a unique system and method that treats a byte or data stream as executable code in the sense that a controller or CPU is made to interpret a byte stream as a sequence of instructions, and execute the instructions. If, when executing a byte stream, a behavior of a malware or shellcode is identified, an embodiment may determine that the byte stream includes a shellcode and may alert a user, prevent the byte stream from reaching a system or computer (e.g., block the stream as known in the art) and/or perform any other action.

Manager unit 210 may select an offset in byte stream 240 and cause runner 260 to execute byte stream from the selected offset. For example, to execute byte stream 240 from a selected offset, runner unit 260 causes a CPU to decode and execute bytes in byte stream 240 one after the other. Monitoring, supervising and/or managing an execution of byte stream 240 may include identifying crashes (e.g., an attempt to write to an invalid address, execute an invalid instruction etc.). For example, an attempt, made by runner unit 260 when executing byte stream 240, to write to an invalid address (e.g., an address that does not exist in a memory address space) may be caught or identified by manager unit 210. Monitoring, supervising and/or managing an execution of byte stream 240 may include identifying and interrupting all OS related operations, e.g., manager unit 210 may interrupt (and prevent execution of) system calls or calling a dll made by runner unit 260 and handle the system calls as described herein. A system call (or kernel call) as known in the art is a request for a service provided by an operating system. A dll (or DLL) is a file format used for holding multiple codes and procedures so that multiple programs can use the dll.

As shown in FIG. 2, a system may include a plurality of manager units 210 and each may include a client 220. A plurality of manager units 210 may interact with, or use, a single OS-EMU 250. As further shown, a system 200 may include a plurality of target units 230 wherein each target unit 230 may include a runner unit 260. In some embodiments, operations and functions of manager unit 210 may be performed by client 220 and a plurality of client 220 units included in a respective plurality of manager units 210 may operate simultaneously such that a plurality of target units 230 and a plurality of runner units 260 run, execute or operate simultaneously. As further described, OS-EMU 250 may provide services to a plurality of clients 220 units, a plurality of target units 230 and/or a plurality of runner units 260. Accordingly, a system according to some embodiments may be scalable, and shellcodes or other malware may be searched for, concurrently and/or simultaneously in a plurality of byte streams 240. As described, a plurality of client-runner couples or manager-runner couples or units may use a single OS-EMU 250 and scaling up a system may only require executing additional client units 220 and additional runner units 260. It will be understood that any description related to a unit such as manager unit 210, client 220, target unit 230 and runner unit 260 is relevant to any number of such units and any number of such units may be included in a system and may, at the same time, simultaneously or concurrently, perform operations as described herein.

In some embodiments, each manager unit 210 has, is associated with, or is connected to, one client 220, and each target unit 230 has, is associated with, or is connected to, one runner unit 260, and each manager/client pair works, cooperates, collaborates or functions as described herein with one target/runner pair. As described, a plurality of couples or pairs of manager/client and target/runner may all work with, or get services from, a single OS-EMU 250.

OS-EMU 250 may be, or may function or operate as, a system call emulator which receives a description of OS calls (or system calls) required or called by, runner unit 260. OS-EMU 250 may emulate an OS by responding to OS or system calls, OS-EMU 250 may run or operate on a system, computing device or environment that is other, or separated from, a system, computing device or environment used for executing runner unit 260. OS-EMU 250 may act as a server or service. OS-EMU 250 may maintain a persistent state for (or of) multiple system-calls called by the same shellcode execution. For example, if runner unit 260, when executing a stream of bytes, calls, runs or executes a first system call and then calls a second system call, the state as it was at the end of the first system call is saved by OS-EMU 250 and used in order to respond to the second system call. A state as referred to herein may include for example register and variables values as known in the art. In some embodiments, emulating an operating system, e.g., by OS-EMU 250 as described, includes providing an application program interface (API). For example, OS-EMU 250 may provide operating system services to runner unit 260, manager unit 210 and/or client 220 using API's as known in the art.

In some embodiments, OS-EMU 250 may emulate any OS, regardless of the OS used for executing OS-EMU 250. For example, OS-EMU 250 may be, or may include, a Linux machine and may still provide service typically provided by a Windows platform. In some embodiments, even though runner unit 260 may be, may be executed on, or may include, a Linux machine, runner unit 260 may still run, directly on the CPU of the Linux machine, a shellcode directed to, designed for, or targeting a Windows based computer. Since, according to some embodiments of the invention, a byte stream is executed by directly providing a sequence of bytes (or words or double-words) in the byte stream to a CPU or controller and causing the CPU to treat the sequence as a sequence of instructions for execution, some embodiments may be indifferent as to the OS targeted by a shellcode, e.g., a shellcode included in a stream of bytes and designed for, or targeting a Mac OS platform may be executed, by runner unit 260, on a Linux machine. Accordingly, some embodiments of the invention may execute, on a first operating system (OS) and at a native speed of a controller, a shellcode included in a stream of bytes, wherein the shellcode is targeting a second, different OS.

To respond to a system call, OS-EMU 250 may provide manager unit 210, at runtime or in real-time, with a description of the system call result. Manager unit 210 use a result description, information or data received from OS-EMU 250 in order to update, set or modify data in a memory used by runner unit 260 thus emulation of a system call made by runner unit 260 may be accomplished.

Manager unit 210 may fully control execution or operation of target unit 230 and/or runner unit 260. For example, as known in the art, the next command or operation to be performed by a CPU is typically stored in a register (e.g., one of registers 261) or counter. Accordingly, by setting the value of a counter or register, manager unit 210 may cause runner unit 260 to resume execution at any selected command, point or offset. For example, upon detecting runner unit 260 calls a system call, manager unit 210 may halt or stop runner unit 260 or otherwise prevent runner unit 260 from executing, send data from a memory of runner unit 260 to OS-EMU 250, receive a response from OS-EMU 250, update memory or registers (e.g., registers 261) of runner unit 260 with, according to, or base on, data received from OS-EMU 250 and cause runner unit 260 to resume execution. Accordingly, with respect to, in the context of, or as seen by, runner unit 260, a system call was performed or called and execution proceeds normally, as if the system call was really and actually executed. For example, controlling and monitoring, of target unit 230 by manager unit 210, may be accomplished using ptrace. As known in the art, using ptrace (abbreviation of "process trace"), one process can control another. Generally, ptrace enables a controlling process (e.g., manager unit 210) to inspect and manipulate the internal state of its target (e.g., target unit 230). Accordingly, manager unit 210 may stop and resume execution of target unit 230, wait for target unit 230 to complete a task, be notified when upon completion of a task, access memory and CPU registers (e.g., registers 261) of target unit 230 etc.

Target unit 230 may monitor and/or control runner unit 260 the same way manager unit controls and monitors target unit 230. For example, runner unit 260 may be spawned by target unit 230 and, accordingly, any control and monitoring performed by manager unit 210 with respect to target unit 230 may be performed by target unit 230 with respect to runner unit 260.

In some embodiments, manager unit 210, target unit 230 and runner unit 260 are computer processes. In some embodiments, manager unit 210 is a parent process that spawns target unit 230, accordingly, target unit 230 may be a child process of manager unit 210. Accordingly, manager unit 210 may be able and/or adapted to monitor any relevant aspect of target unit 230. For example, as known in the art, a parent process can control the input of a child process, read or write a memory that is internal to the child process and so on. It will therefore be understood that manager unit 210 may fully monitor and control execution and/or operation of target unit 230. For example, manager unit 210 may supply target unit 230 with an offset, in byte stream 240, from which to read, and target unit 230 may cause runner unit 260 to treat the byte stream as if it were executable code, e.g., interpret and treat byte stream 240 as commands for execution.

In some embodiments, target unit 230 executes (or calls) runner unit 260, accordingly, target unit 230 may be considered as a layer around runner unit 260. Various techniques may be used in order to enable control and communication. For example, mmap (a system call that maps files or devices into memory thus enabling memory-mapped file input/output (I/O) communication and control) may be used, by manager unit 210 in order to reinitialize target unit 230, e.g., upon selecting a new offset for execution in byte stream 240.

In some embodiments, a read-only memory may be set or allocated in runner unit 260 at a set-up time, and the read-only memory may be used as a backup. For example, after selecting an offset (e.g., when a system first starts running or following an execution from previous offset) for execution, a backup may be copied into a writable memory and the backup is used, by runner unit 260, for the next run or next execution of byte stream 240, e.g., an execution from a newly selected offset. Accordingly, if the execution from a first offset spoils the memory content of runner unit 260, the read-only backup allocation is still intact and can be copied again between each offset shift to the writable allocation for further executions. As referred to herein, an offset shift is related to a selection and value of a new offset.

In some embodiments, a setup code used for preparing runner unit 260 of execution and code used by runner unit 260 for actual execution of a byte stream (also referred to herein as byte execution code) may be separated. Setup code may be any code designed for preparing runner unit 260 for, or before, actual execution of a stream of bytes. A signal may be used to inform manager unit 210 whether runner unit 260 is executing setup code or byte execution code. For example, after runner unit 260 runs setup code, it sends a SIGINT signal (a signal sent to interrupt a process) to itself in order to let the manager unit 210 receive the SIGINT, and thus inform manager unit 210 that it finished its setup and is ready to start executing a byte stream. In another example, mmap may be used as a mailbox enabling units of system 200 to communicate, e.g., runner unit 260 may inform manager unit 210 of its state using a shared memory object as known in the art.

In some embodiments, a plugin (e.g., plugin 262) is included in runner unit 260. Generally, and as known in the art, a plugin (or plug-in) is a software component that adds a specific feature to an existing computer program. For example, plugin 262 in runner unit 260 may function with no dependency outside its own scope. A memory address of plugin 262 that may be included or embedded in runner unit 260 as shown by FIG. 2 may be known in advance and to manager unit 210, accordingly, manager unit 210 may load the instruction pointer (a pointer to the next instruction to be executed by a CPU) of runner unit 260 with the plugin's address in order to cause runner unit 260 to execute plugin 262. Any functionality may be performed by plugin 262. Although a single plugin 262 is shown in FIG. 2, it will be understood that any number of plugins may be embedded or included in runner unit 260. Accordingly, manager unit 210 may cause runner unit 260 to perform a functionality or operation, e.g., by setting the instruction pointer of runner unit 260 to point to an entry point of plugin 262 as known in the art.

In order for runner unit 260 to go back to its previous instruction pointer after it finishes running a plugin, runner unit 260 may send a SIGINT to itself upon completing execution of a plugin, thus informing manager unit 210 that it can resume execution of runner unit 260 at its previous instruction pointer. A plugin (e.g., plugin 262) may be prevented from spoiling the stack and registers (e.g., registers 261) of runner unit 260, for example, prior to executing plugin 262, the registers and stack of runner unit 260 may be backed-up, e.g., by manager unit 210, and the registers and stack may be re-loaded for runner unit 260, by the manager unit 210 after plugin 262 terminates.

At a setup phase, e.g., upon first execution of an instance of runner unit 260, runner unit 260 may allocate memory. For example, runner unit 260 may allocate a read only memory initialized with the address of byte stream 240, the value in this memory may be used as a backup between offset shifts enabling runner unit 260 to resume execution when provided with a new offset. Runner unit 260 may allocate other memory segments, e.g., a read/write/execute memory for the execution at each shift, a read/write memory for a mailbox, a read/write memory for plugin input messages and/or a read/write memory for plug-in output messages. Runner unit 260 may use a signal as described in order to inform manager unit 210 that setup is complete and that runner unit 260 is ready to execute a byte stream.

Some embodiments of the invention enable detecting malware and shellcode in a byte stream by preventing a child process from crashing when it is executing random bytes as found in a byte stream. It is noted that byte stream 240 may be any byte stream that may not be suitable for execution. As known in the art, executable code (e.g., executable code 125 described herein) is code that is specifically generated and tailored for execution by a CPU. However, if a byte stream that is not designed for execution by a CPU (e.g., a random or other byte stream such as byte stream 240) is provided to a CPU for execution then unexpected results are likely to be observed, e.g., a crash as known in the art.

Understandably, when executing byte stream 240, runner unit 260 may crash since byte stream 240 may not be suitable for execution by a CPU. For example, although an attacker may embed or hide a shellcode in byte stream 240 in an attempt to gain control of a computer that receives byte stream 240, byte stream 240 may originally be, or may include a digital representation of a webpage, a video clip or a text file or other content that is not valid executable code and is therefore unsuitable for execution by a CPU.

In some embodiments, if or when runner unit 260 exits or crashes, target unit (or process) 230 may perform a fork operation as known in the art. As known in the art, fork is an operation whereby a process creates a copy of itself. Accordingly, a fork operation may create a new target unit (or instance or process) 230 and a new runner unit (or instance or process) 260 In some embodiments, after or before performing a fork, target unit 230 may set or increment the offset (or offset shift) such that the offset (or offset shift) used by a new runner unit 260 in the forked (or newly created) target unit 230 is one after the byte that caused runner unit 260 to crash or exit. Accordingly, the last offset shift may be skipped by an increment of 1, a new offset that is the last offset plus one is determined or created and the new offset may be used as the starting offset for the new (or forked) target unit 230 and new runner unit 260.

Accordingly, a new target unit 230 may resume the work of the previous target unit 230 from where the previous target unit 230 exited, but prevent the new target unit 230 from executing the byte (or offset in stream 240) that caused the previous target unit 230 to crash.

For example, in some embodiments, target unit 230 wraps runner unit 260. For example, wrapping includes forking or spawning runner unit 260 by target unit 230 such that target unit 230 has full access to any memory used by runner unit 260, including CPU registers (e.g., registers 261) and the like. In some embodiments, if or when runner unit 260 exits or crashes, a new target unit 230 is created by forking the manager unit 210. It is noted that the forking does not create a new manager unit 210 but creates a new target unit 230. The new target unit 230 then creates a new runner unit 260 that is caused to execute such that it avoids executing the offset that caused the previous runner unit 260 to crash (e.g., the program counter of the newly created runner unit 260 is set to one byte (or word or any other data unit used as instruction) after the byte that caused the crash as described.

Of course, a fork or re-fork as described can happen several or many times when executing a specific stream of bytes, e.g., as many times as a crash or exit happens when executing a stream of bytes that is not necessarily (and most possibly not) suitable for execution by a controller or CPU.

Runner unit or process 260 may generate various signals that may be caught or intercepted by manager unit 210. For example, signals raised and intercepted may be SIGSEGV or SIGBUS as known in the art. As known in the art, SIGSEGV is a fault raised (or indicated) by hardware with memory protection, notifying (e.g., an operating system) of a memory access violation, e.g., an attempt to access a memory address that does not exist. SIGBUS is a bus error or fault raised by hardware, notifying that a process is trying to access memory that the CPU cannot physically address. For example, using a signal, target unit 230 may inform manager unit 210 that the byte stream being processed or executed is not considered a relevant shellcode, and that a new execution at an incremented shift should be started.

In some embodiments, a loop comprising selecting an offset or shift and executing from the selected offset may be performed until a shellcode is detected in the byte stream. For example, at each iteration of the loop, manager unit 210 may write the selected offset or shift value to a mailbox, and may set the instruction pointer of runner unit 260 (or of a plugin such as plugin 262 in runner unit 260) to the mailbox. Runner unit (or a plugin therein) may read the shift from the mailbox, may copy the backup memory into a runtime memory, may signal manager unit 210 that a new execution is starting, and may start executing the input byte stream from this shift read from the mailbox. In some cases, the shift or offset is incremented by one at each iteration of the loop, in other cases, other increments may be used.

If or when runner unit 260 crashes or is about to crash or exit, manager unit 210 may set its instruction pointer to the mailbox and may let, or cause, runner unit 260 start again from the new shift. Accordingly, runner unit 260 may be reset, e.g., by manager unit 210, on the fly.

For example, detecting that runner unit 260 is about to crash may be achieved by catching, detecting or identifying, by manager unit 210, an error signal sent or raised by runner unit 260 (e.g., a signal raised as known in the art). Accordingly, manager unit 210 may identify, detect or "know" that runner unit 260 is about to crash or that runner unit 260 has crashed. Any other method as known in the art may be used, e.g., by manager unit 210, in order to determine that a process (e.g., runner unit 260) has crashed or exited.

As described herein, manager unit 210 may fully control runner unit 260, specifically, manager unit 210 may fully control execution of runner 260 and the offset in byte stream 240 used, consumed, or executed by, runner unit 260 as described herein. For example, manager unit 210 may cause runner unit 260 to exit, e.g., when a shellcode is detected.

Monitoring and controlling of runner unit 260, by manager unit 210 may include setting a timer, e.g., plugin 262 that may be embedded in runner unit 260, and, if or when the timer expires, manager unit 210 may terminate runner unit 260 or perform other tasks. For example, if, when executing a stream of bytes as described, runner unit 260 enters an infinite loop, a timer as described may cause manager unit 210 to terminate runner unit 260, increment the offset (thus ensuring the infinite loop is not entered again) and run a new instance of target unit 230 and/or runner unit 260.

In another case, runner unit 260 may set its own instruction pointer to zero or other invalid value. As described, manager unit 210 may monitor all environment variables or data of runner unit 260 and, accordingly, if an invalid value is set in the instruction pointer of runner unit 260, manager unit 210 may increment the offset or shift as described and reset (or re-run or initialize) runner unit 260 as described.

As described, treating a byte stream as executable code and executing (or attempting to execute) the byte stream may be sandboxed or done in a sandbox. For example, in some embodiments, sandboxing an execution of a byte stream (e.g., treating bytes in stream of bytes 240 as if they are instructions in an executable code) includes preventing runner unit 260 from executing system calls. For example, depending on the OS targeted or receiving byte stream 240, OS-EMU 250 may emulate an OS and preventing runner unit 260 from executing system calls includes intercepting attempts made by runner unit 260 to execute system calls, halting or suspending execution of runner unit 260, sending data related to the system call to OS-EMU 250 (e.g., name of system call, arguments and the like), generating a response for a system call, by OS-EMU 250, updating a memory of runner unit 260 according to a response and resuming execution of runner unit 260.

In order to sandbox the execution, one embodiment may prevent all eventual system calls that occur when runner unit 260 processes input, e.g., when runner unit 260 executes byte stream 240 as described. As described, some embodiments may emulate the OS targeted by the shellcode, e.g., a shellcode included in byte stream 240. Accordingly, in some embodiments, an emulation implementation may be OS dependent. In some cases, e.g., if the OS targeted by a shellcode and the OS used for executing units of system 200 are the same (e.g., Linux), an embodiment may run or execute system calls natively, e.g., on a Linux machine, but, since executing system calls natively may be or may cause a security risk and/or lack of control and visibility over the shellcode actions, an embodiment may emulate system calls as described even if the OS targeted by a shellcode and the OS used for executing units of system 200 are the same.

In some embodiments, system calls may be hooked. For example, a system call may be intercepted client 220. Client 220 may read the system call parameters from a memory of runner unit 260 and may send the parameters to OS-EMU 250. Client 220 may write responses from OS-EMU 250 into a memory of runner unit 260 and then resume execution of runner unit 260.

For example, ptrace described above may be used. For example, client 220 may detect a system call about to be called by runner unit 260 by inspecting the ORIG_RAX value in the memory of runner unit 260, and then set this value to −1. As known in the art, under the Linux OS, a value of −1 in ORIG_RAX has the effect of canceling the native system call execution. Similar methods may be used by embodiments of the invention when other OS's are used by system 200.

If the OS receiving byte stream 240 is Windows and embodiment may prevent runner unit 260 from running any Linux system calls, e.g., as describe above or by otherwise preventing runner unit 260 from executing Linux system calls (e.g., by manipulating its program counter as described).

In addition, if the relevant OS is Windows, a memory of runner unit 260 may be made to include elements of a Windows process memory, e.g., data objects such as a process Environment Block (PEB), thread Environment Block (TEB) and various dll headers.

In some embodiments, the PEB, TEB and dll dumps or data structures may be synthesized by a separate script. For example, a script may be used to build a custom Windows memory which contains information about the dll's emulated and their functions locations, according to Windows official documentation.

In some embodiments, the first byte of each dll function stored in the memory of runner unit 260 as described may be replaced with a 0xCC such that it is interpreted or causes a SIGTRAP signal as known in the art, the signal, when raised by runner unit 260 when executing the 0xCC cause manager unit 210 to intercept the SIGTRAP, read the dll stored immediately after the 0xCC and emulate a system call, using OS-EMU 250 as described herein. It is noted that replacing the first byte (e.g., with 0xCC as described) may be detected by a shellcode (and the shellcode may consequently terminate its execution). Since causing a shellcode to execute while unaware that is not actually executing on a target OS is an objective of some embodiments, other methods may be used. For example, in some embodiments, an address of a dll is simply left un-mapped, thus, when a shellcode accesses the un-mapped address it causes a SIGSEGV as known in the art and the SIGSEGV signal or interrupt may be caught or intercepted by manager unit 210 as described. Accordingly, accessing a dll by a shellcode when executed by an embodiment as described may be identified and/or intercepted.

Generally, when receiving a signal (e.g., SIGSEGV) from runner unit 260, manager unit 210 may check if the instruction pointer value of runner unit 260 corresponds to one of a pre-configured dll and, if so, the system call may be emulated as described herein.

In some embodiments, only addresses of dll's may be required. For example, if both manager unit 210 and OS-EMU 250 know the addresses of dll's then the address alone, as referenced by runner unit 260 when attempting to execute a dll may suffice in order to emulate the dll since, based on the address, the dll may be identified.

After a call is emulated as described, manager unit 210 may set the instruction pointer runner unit 260 to the return address located in the stack, and clean the stack.

Since the Windows custom memory dumps stored in a memory of runner unit 260 may be read-only, there is no need to reload them at each shift (or when runner unit 260 is reset as described) when searching for shellcode. Only one loading may be needed, e.g., at initialization, accordingly, efficiency is increased.

An issue concerning Windows (when executing a shellcode that targets a Windows platform) may be the use made by Windows OS of the GS register as known in the art. For example, in Windows, a TEB address is relative to a segment created by the OS and referenced by GS. As known in the art, the GS register is a segment register. It has no processor-defined purpose, but rather is given purpose by the OS's running them. For example, in Windows, the GS register is used to point to operating system defined structures. For example, some embodiments of the invention support segment-addressing in order to let or enable a shellcodes find the TEB location.

For example, when target unit 230 executes runner unit 260, manager unit 210 may set the GS register (that may be one of registers 261) of target unit 230 with a value pointing to a soon-to-be-created segment descriptor in the local descriptor table (LDT). Then by using a combination of the modify_ldt (a Linux environment variable used to get or set a per-process LDT entry) and the arch_prctl (a Linux environment variable used to set architecture-specific thread state) system calls in runner unit 260, a new segment descriptor is created in the LDT table of runner unit 260. Of course the base address of this new segment must be consistent with the memory dumps in runner unit 260 as described, e.g., the base address is set so that it points to the address of the TEB memory in the dump. As a result, any use of GS by a Windows shellcode will relate to the correct segment.

In some embodiments manager unit 210 and OS-EMU 250 may communicate using Unix sockets as known in the art. In some embodiments, for each OS call made by runner unit 260 and intercepted or detected by client 220 as described, client 220 may send, to OS-EMU 250, the relevant registers values (e.g., as read from registers 261 of runner unit 260 as described) which are the call parameters, as well as the eventual binary data pointed to by the parameters.

A binary protocol may be used. For example, each packet sent by the client 220 to OS-EMU 250 may contain its length, a connection id, a system call name and/or a dll function name, a descriptor describing the eventual additional inputs retrieved by manager unit 230 from a memory of runner unit 260 and the input bytes as read from byte stream 240.

OS-EMU 250 may respond, to manager unit 230, with a packet that may contain the response register (RAX) value, and possibly data modified by the call. The caller (manager unit 210 or client 220) may then update the memory of runner unit 230 according to the packet received from OS-EMU 250, thus, from the perspective, or as seen by, runner unit 260, a system call was completed successfully.

OS-EMU 250 may maintain a persistent state for each specific client, session or requestor requesting the call. This enables OS-EMU 250 to use in a later OS call the results of a previous OS call. For example, a socket created in a system call may be used by a later system call to send or receive. For example, a connection ID described herein may be used by OS-EMU 250 in order to identify sessions or callers.

In some cases, emulating a system call cannot be done solely or entirely by OS-EMU 250, for example, in the case where new memory inside runner unit 260 needs to be allocated.

Some embodiments of the invention may handle cases involving memory allocation inside runner unit 260 using a plugin as described herein. For example, a plugin may be used when an mmap system call is called or requested by a Linux shellcode (e.g., included in byte stream 240 and executed by runner unit 260), or when mmap is used for a kernel32/VirtualAlloc dll call requested by a Windows shellcode as known in the art.

In this case, manager unit 210 may use an mmap plugin (a plugin that executes mmap within, or in the process context of, runner unit 260) before communicating with OS-EMU 250. Manager unit 210 may back-up the registers of runner unit 260, send the input parameters to the memory allocated for plugin input messages, and run the mmap plugin which performs the requested mmap allocation. For example, in some embodiments, manager unit 210 stores the backed-up registers in (or send them to) a memory that is specifically allocated for registers. For example, using ptrace as known in the art, registers (e.g., registers 261) used by a CPU may be written to or modified, for example, in some embodiments, manager unit 210 may use ptrace in order to halt or stop runner unit 260, update registers of a CPU executing runner unit 260 (e.g., registers 261) and then resume execution of runner unit 260. Accordingly, at any point in time or during an execution of runner unit 260, manager unit 20 may halt runner unit 260 or suspend execution of runner unit 260, backup registers of runner unit 260, execute a system call using OS-EMU 250 as described, update a memory of runner unit 260 according to results of an executed system call, update (or restore) registers of runner unit 260 using the backed-up registers, and resume execution of runner unit 260.

An mmap plugin may then write the new memory allocated address into the memory allocated for plugin output messages (e.g., using a mailbox as described), reload back the registers of runner unit 260 and read the plugin outputs from the memory allocated for plugin output messages. The address of the newly allocated memory may then be sent to OS-EMU 250, and may be used by OS-EMU 250 in order to keep a persistent state of runner unit 260. For example, the OS-EMU 250 may need to write to this newly allocated memory at a later stage.

In some embodiments, when the mmap plugin uses the mmap function, it uses it in a sanitized way, checking the validity of the parameters supplied and may map the newly allocated memory to a file in a shared file system. This enables another process or unit, e.g., OS-EMU 250, to write (and read) to this file, and as a consequence, memory allocated by an mmap plugin as described acts as a shared memory between that can be used by runner unit 260, OS-EMU 250, manager unit 230 or client 220.

For example, using the above described mmap technique, OS-EMU 250 (or other units in system 200) can write to (and read from) a memory allocated by runner unit 260. For example, in some cases, a shellcode executes mmap to allocate memory and later on download some data to the allocated memory. Using the above described mmap technique, units in system 200 may readily access data downloaded by a shellcode.

Accordingly, while embodiments of the invention enable executing OS calls or system calls as described, embodiments of the invention enable, at the same time, a clean separation between runner unit 260 and the OS-EMU 250 thus providing a clean separation between the shellcode execution and the system call emulations. For example, code of a shellcode may be executed on a first system, unit, device or process (e.g., runner unit 260) and system calls executed or called by the shellcode may be executed on a second, different system, unit, device or process (e.g., OS-EMU 250). Accordingly, a shellcode, when executed, is prevented from calling system calls on the machine, system, unit or device used for running it.

In some embodiments OS-EMU 250 may be designed and implemented to operate asynchronously hence OS-EMU 250 can provide services as described to a plurality of manager units 210 running different shellcodes. As described, OS-EMU 250 may be designed and implemented to service to a plurality of manager units 210 running different shellcodes at the same time, concurrently or simultaneously and in a non-blocking way.

Embodiments of the invention as described improve the field of computer and internet security in a number of ways. For example, embodiments of the invention enable detection of malware in any stream of bytes, including shellcodes of various types, something current or known systems are unable to do. For example, a shellcode using simple tricks to exhaust a CPU (e.g., endless loops and the like), or calling non common instructions (there are hundreds such non common instructions as known in the art) would not be detected by current or known systems, but would be detected by some systems and methods according to embodiments of the invention as described herein. In this way the operation of the computer system may be improved as well.

Embodiments of the invention address the Internet-centric and/or computer-centric challenge of detecting malware in any stream or flow of data. This challenge may be addressed, for example, by feeding a stream of bytes to a CPU (e.g., a CPU included in runner unit 260) and causing the CPU to treat the stream of bytes as executable code, including executing the stream of bytes. Prior to the invention, simply causing a CPU to execute a stream of bytes would cause the CPU to perform unexpected operations and eventually halt, exit or crash as known in the art. By controlling an execution of a stream of bytes as described, embodiments of the invention may solve the prior art's problems and deficiencies. In particular, embodiments of the invention may enable a robust system and method that can detect malware or shellcode without crashing.

Embodiments of the invention enable a robust system and method that may separate or detach a shellcode execution from the execution of system calls and/or dll calls, accordingly, a shellcode being executed cannot access system calls and/or dll calls, thus, a security enhancement is achieved.

Some embodiments of the invention may be configured or adapted to execute a stream of bytes directly on a hardware controller or CPU, at a native speed of the controller or CPU. For example, current and/or known systems and methods emulate execution of a shellcode by running or executing the shellcode on an emulated CPU in a high-level programming language. Executing a stream of bytes directly on a hardware controller or CPU, at a native speed as done by some embodiments may include providing the stream of bytes (e.g., byte after byte) directly to a CPU, e.g., pointing the CPU's program counter to a byte in the byte stream and causing the CPU to start executing the byte stream from the byte pointed to. Executing a stream of bytes directly on a hardware controller or CPU, at a native speed may include copying bytes from the stream of bytes directly into the CPU. Any way or method for executing a byte stream without going through an emulation layer or an operating system may be regarded herein (and in the art) as executing the stream of bytes directly on a CPU.

In contrast, some embodiments of the invention do not emulate a CPU in order to execute a shellcode, rather, instruction are fed (or provided) to a hardware CPU directly, as is and the hardware CPU is caused to execute the instructions (or bytes in a byte stream as described). Accordingly, an improvement is achieved since executing a shellcode on an emulated CPU is slower by an order of at least three compared to executing a shellcode directly on a real or hardware CPU.

Another improvement is realized and/or achieved by embodiments of the invention as described due to the fact that a real, or hardware, CPU will execute (or at least attempt to execute) all (or any) shellcode instructions it receives. In contrast, an emulated CPU has limited support for shellcode instructions. An emulated CPU as known in the art will only run instructions it is designed for executing, but a hardware CPU (used by some embodiments as described) will execute any instruction it receives as described. Accordingly, embodiments of the invention enable treating any byte or data stream as if it is executable code and may cause a CPU to treat any data stream as such, accordingly, embodiments of the invention may detect shellcode in any byte or data stream, something known or current systems and methods cannot do.

Even when executing a stream of bytes directly on a hardware controller or CPU, some embodiments may be configured or adapted to prevent a malware included in the executed stream of bytes to take control of the hardware controller. For example, as described, by executing code such as system calls and dll's on a separate unit, device, machine or system (e.g., OS-EMU 250 may be physically separated from runner unit 260), a shellcode is prevented from gaining control of a CPU (e.g., a CPU included in OS-EMU 250)

Figure 3:
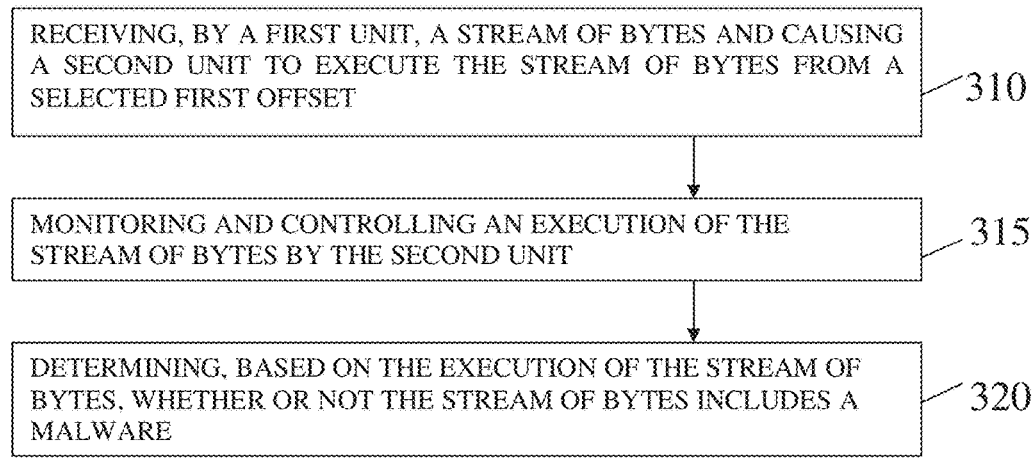
FIG. 3 shows a flowchart of a method according to illustrative embodiments of the present invention.

Reference is made to FIG. 3, a flowchart of a method according to illustrative embodiments of the present invention. As shown by block 310, a stream of bytes may be received by a first unit and a second unit may be caused to execute the stream of bytes, from a selected offset. For example, manager unit 210 (a first unit) may receive byte stream 240 and may cause runner unit 260 (the second unit) to execute byte stream 240. As shown by block 315, execution of the stream of bytes may be monitored and controlled. For example, manager unit 210 may monitor and control an execution of byte stream 240 by runner unit 260. As shown by block 320, based on an execution of the stream of bytes, it may be determined whether or not the stream of bytes includes malware software, a malware, or a malware software unit or module. For example, manager unit 230 may determine that byte stream 240 includes a shellcode based on an execution, by runner unit 260, of byte stream 240 as described.

As described, if it is determined that, in a first offset or shift (e.g., in offset or shift 242), a stream of bytes does not include a malware then a first unit (e.g., manager unit 210) in some embodiment of the invention may select a second offset (e.g., offset or shift 243) in the stream of bytes and cause a second unit (e.g., runner unit 260) to execute the stream of bytes from the selected second offset.

As described, determining that a stream of bytes includes a malware (e.g., when executing byte stream 240 from offset 244 where shellcode 245 is placed) may include identifying a behavior of a shellcode when executing the stream of bytes. As described, if an execution of the stream of bytes crashes then some embodiments may determine that, at the selected offset, the stream of bytes does not include a malware. If an execution of the stream of bytes crashes then some embodiments may immediately recover and cause a unit (e.g., runner unit 260) to execute the stream of bytes from a second, different offset.

OS-EMU 250 may be adapted to provide real-time interaction with a shellcode included in a stream of bytes. Runner unit 260 may be adapted to execute a byte stream in real-time. Target unit 230 and/or manager unit 210 may be adapted to reset, re-run or re-execute runner unit 260 in real-time.

The term "real-time" (also known referred to in the art as "realtime", or "real time") as referred to herein generally relates to processing or handling of events at the rate or pace that the events occur or received. For example, OS-EMU 250 may be adapted to provide a response to a system call in real-time, e.g., within milliseconds or other very brief periods after receiving a call or request as described. Runner unit 260 may be adapted to execute a byte stream in real-time, e.g., cause a hardware CPU to treat and execute bytes, words or double-words as, or within milliseconds after they are received over a byte stream. Target unit 230 and/or manager unit 210 may be adapted to reset, re-run or re-execute runner unit 260 in real-time, e.g., immediately when or within milliseconds after runner unit 260 crashes or halts, target unit 230 may re-run runner unit 260 as described.

As described, a system and method according to embodiments of the invention may use two or more computing devices, controllers or CPU's (e.g., two processes, manager unit 210 and runner unit 230, executed on two different CPU cores as known in the art) in order to detect or identify shellcode in a way that is impossible by systems and methods known in the art. For example, using a first process (manager unit 210 or client 220) executed on a first core and a second process (target unit 230 or runner unit 260) executed on, or by, a second, different core, a system and method according to embodiments of the invention can handle crashes as described, something known systems and methods cannot do and therefore are unable to execute a stream of bytes, e.g., in order to detect a malware as described. For example, runner unit 260 may (and typically does) crash as described when executing byte stream 240 but, as described, a system and method may quickly and efficiently recover from such crashes, skip the byte that caused the crash (e.g., skip to the next offset as described) and attempt (repeatedly, again and again) to execute the byte stream until a shellcode is detected or until the end of the byte stream is reached. For example, and as described, target unit 230 (a first process) may shift or select the offset after a crash of runner unit 260 (a second process) and re-spawn runner unit 260 thus, crashes are efficiently handled and execution of a byte stream (that is typically unsuitable for execution) may be achieved.

Accordingly, a system and method according to some embodiments of the invention improve known systems and methods. For example, in contrast with known systems and methods that cannot recover from a crash embodiments of the invention can recover quickly, safely and efficiently from crashes as described herein. The advantage of recovering from crashes caused by executing a byte stream (that is typically unsuited for execution by a controller as explained herein), skipping to a next or new offset in the byte stream and executing from the new offset may be appreciated by those with skills in the art, for example, embodiments of the invention as described may search for, and detect or identify shellcode in any byte or data stream, regardless of the type of the stream.

As described, a system and method according to some embodiments of the invention use specific and innovative data and work flows. For example, a flow of executing a byte stream, by a first unit while a second unit controls the flow is unique in the field of malware detection. Similarly, the flow of backing up, by a controlling unit (e.g., manager unit 210) registers of an execution unit (e.g., runner unit 260), causing the execution unit to execute a system call or dll and then restoring the registers of the execution unit such that the execution unit resumes execution from a point preceding execution of the system call or dll is unique and innovative, e.g., it enables a system and method to control execution of system calls or dll's by a shellcode. Additionally, using a separate unit for executing (or simulating execution of) system calls or dll's (e.g., using OS-EMU 250 as described herein) is unique and innovative. For example, using OS-EMU 250 as described herein enables systems and methods according to some embodiments to safely let a shellcode execute or call system calls or dll's without actually letting the shellcode tamper with actual or real system resources. For example, when known systems and methods execute a shellcode on a real system, e.g., in an attempt to identify or detect the shellcode, the shellcode may damage the system, e.g., delete system files, change configuration values of a system and so on, in contrast and as described herein, a system and method according to some embodiments of the invention can freely and safely execute a shellcode since the shellcode cannot actually or really run system calls or dll's, rather, the shellcode is fooled to think it ran a system call or called a dll while in fact, the system call or function in a dll is executed in a controlled manner, not in the context of the shellcode and using services of OS-EMU 250 as described. Accordingly, not only the technology of malware detection is improved, but improvements to the functioning of a computer itself are enabled, realized and provided by embodiments of the invention.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A system comprising:
a hardware unit executing a first process and a second, different, process;
the first process configured to:
  receive a stream of bytes,
  select a first offset,
  cause the second process to execute the stream of bytes from the first offset, and
  monitor an execution of the stream of bytes by the second process; and the second process configured to:
  execute the stream of bytes from the first offset;
  wherein the first process is configured to perform at least one of: start execution of the second process, stop execution of the second process and resume execution of the second process, and wherein the first process is further configured to determine, based on the execution of the stream of bytes, whether or not the stream of bytes includes a malware.

2. The system of claim 1, wherein the first process is configured to:
  if it is determined that the stream of bytes does not include malware then:
    selecting a second offset in the stream of bytes; and
    causing the second process to execute the stream of bytes from the selected second offset.

3. The system of claim 1, wherein determining that the stream of bytes includes malware includes identifying a behavior of a shellcode when executing the stream of bytes.

4. The system of claim 1, wherein the second process is configured to execute the stream of bytes directly on a hardware controller, at a native speed of the hardware controller.

5. The system of claim 4, wherein the first process is configured to prevent the malware, when executed by the second process, to take control of the hardware controller.

6. The system of claim 2, wherein the processes are configured to:
  if the execution of the stream of bytes crashes, then:
  immediately recover and cause the second process to execute the stream of bytes from the second offset.

7. The system of claim 1, wherein the second process is adapted to execute, on a first operating system (OS) and at a native speed of a controller, a shellcode included in the stream of bytes, wherein the shellcode is targeting a second, different OS.

8. The system of claim 1, comprising a third process including a memory and a controller, the third process configured to emulate an operating system application program interface (API) and to provide operating system services to the second process.

9. The system of claim 8, wherein the third process is configured to provide operating system services to a plurality of processes.

10. The system of claim 8, wherein the third process is configured to provide real-time interaction with a shellcode included in the stream of bytes.

11. A method comprising:
  receiving a stream of bytes by a first unit, the first unit including a memory and a controller;
  selecting, by the first unit, a first offset;
  causing, by the first unit, a second, different unit to execute the stream of bytes from the selected first offset wherein the second unit includes a memory and a controller;
  monitoring, by the first unit, an execution of the stream of bytes by the second unit; and
  determining, based on the execution of the stream of bytes, whether or not the stream of bytes includes malware;
  wherein the first unit is configured to perform at least one of: start execution of the second unit, stop execution of the second unit and resume execution of the second unit, and wherein the first unit is further configured to determine, based on the execution of the stream of bytes, whether or not the stream of bytes includes malware.

12. The method of claim 11, comprising:
  if it is determined that the stream of bytes does not include malware, then:
    selecting a second offset in the stream of bytes; and
    causing the second process to execute the stream of bytes from the selected second offset.

13. The method of claim 11, wherein determining that the stream of bytes includes malware includes identifying a behavior of a shellcode when executing the stream of bytes.

14. The method of claim 11, comprising executing the stream of bytes directly on a hardware controller, at a native speed of the hardware controller.

15. The method of claim 14, comprising preventing the malware, when executed, to take control of the hardware controller.

16. The method of claim 11, comprising, if the execution of the stream of bytes crashes, then causing the second process to execute the stream of bytes from a second offset.

17. The method of claim 11, comprising executing, on a first operating system (OS) and at a native speed of a controller, a shellcode included in the stream of bytes, wherein the shellcode is targeting a second, different OS.

18. The method of claim 11, comprising emulating an operating system application program interface (API) and provide operating system services to an execution of the stream of bytes.

19. The method of claim 18, comprising providing, by a third process including a memory and a controller, operating system services to a plurality of processes that execute a respective plurality of byte streams.

20. The method of claim 18, comprising providing real-time interaction with a shellcode included in the stream of bytes.

21. A method comprising:
  selecting, a first offset in a byte stream;
  causing a first unit including a memory and a controller to execute the byte stream from the selected first offset;
  monitoring, by a second, different unit including a memory and a controller, an execution of the byte stream; and
  determining, by the second unit and based on a result of the execution, whether or not the stream of bytes includes malware;
  wherein the first unit is configured to perform at least one of: start execution of the second unit, stop execution of the second unit and resume execution of the second unit, and wherein the first unit is further configured to determine, based on the execution of the stream of bytes, whether or not the stream of bytes includes malware.

* * * * *